United States Patent
Childers

(12) 
(10) Patent No.: US 6,824,339 B1
(45) Date of Patent: Nov. 30, 2004

(54) BELT WINCH SPEED HANDLE

(76) Inventor: John Ray Childers, Rte. 2, Box 2425, Toccoa, GA (US) 30577

( * ) Notice: Subject to any disclaimer, the term of this patent is extended or adjusted under 35 U.S.C. 154(b) by 0 days.

(21) Appl. No.: 10/624,828

(22) Filed: Jul. 22, 2003

(51) Int. Cl.⁷ .......................... B65D 25/28; B61D 45/00
(52) U.S. Cl. ...................................... 410/103; 16/110.1
(58) Field of Search .................................. 410/100, 103, 410/12, 96, 97, 156; 16/110.1, 114.1

(56) References Cited

U.S. PATENT DOCUMENTS

| | | |
|---|---|---|
| 2,673,068 A | 3/1954 | Schinker |
| 2,738,204 A | 3/1956 | Ibey |
| 3,428,331 A | 2/1969 | Morgan et al. |
| 4,117,568 A * | 10/1978 | Bullock ...................... 16/110.1 |
| 4,367,993 A | 1/1983 | Meigs |
| 4,382,736 A * | 5/1983 | Thomas ....................... 410/104 |
| 4,390,141 A * | 6/1983 | Webster ................... 242/404.2 |
| 4,510,652 A | 4/1985 | van Iperen |
| 4,827,794 A * | 5/1989 | Hummel et al. .............. 74/543 |
| 4,884,928 A | 12/1989 | Nachtigall et al. |
| 4,913,608 A | 4/1990 | Royball |
| 5,234,298 A * | 8/1993 | Shuker ........................ 410/98 |
| 5,433,565 A | 7/1995 | Chan |
| 5,460,465 A | 10/1995 | Little |
| 5,490,749 A | 2/1996 | Arbues |
| 5,664,918 A | 9/1997 | Heider et al. |
| D395,998 S | 7/1998 | Ballinger |
| 5,775,175 A | 7/1998 | Salemno et al. |
| 5,899,646 A | 5/1999 | Tatina et al. |
| D423,332 S | 4/2000 | Salter |
| 6,056,488 A * | 5/2000 | Depoy ........................ 410/100 |
| 6,092,437 A * | 7/2000 | Sumner ....................... 74/544 |
| 6,102,637 A * | 8/2000 | Mocci ........................ 410/103 |
| 6,179,534 B1 * | 1/2001 | Weckter ..................... 410/103 |
| 6,200,079 B1 | 3/2001 | Little |
| 6,398,470 B1 | 6/2002 | Mosley |
| 6,467,716 B1 | 10/2002 | Hamilton |
| 6,659,697 B1 * | 12/2003 | Guenther .................... 410/103 |
| 2003/0082022 A1 * | 5/2003 | Botelho ...................... 410/100 |
| 2004/0037665 A1 * | 2/2004 | Im .............................. 410/103 |

* cited by examiner

*Primary Examiner*—D. Glenn Dayoan
*Assistant Examiner*—H. Gutman
(74) *Attorney, Agent, or Firm*—Hinkle & O'Bradovich, LLC

(57) ABSTRACT

A handle for speed winding a strap back onto a belt winch having a ratchet mechanism, a winch drum and an annular cylinder is described. The speed handle generally includes an elongated arm having a grip on the upper surface adjacent the first end and a handle drum on the lower surface adjacent the second end. The handle drum includes a tapered end and is adapted to fit into the annular cylinder of a belt winch. The handler drum includes a protrusion with a tapered end, adapted to fit into an aperture on the annular cylinder. Once placed on the belt winch, the speed handle allows the user to rapidly rewind a strap back onto the winch drum.

12 Claims, 3 Drawing Sheets

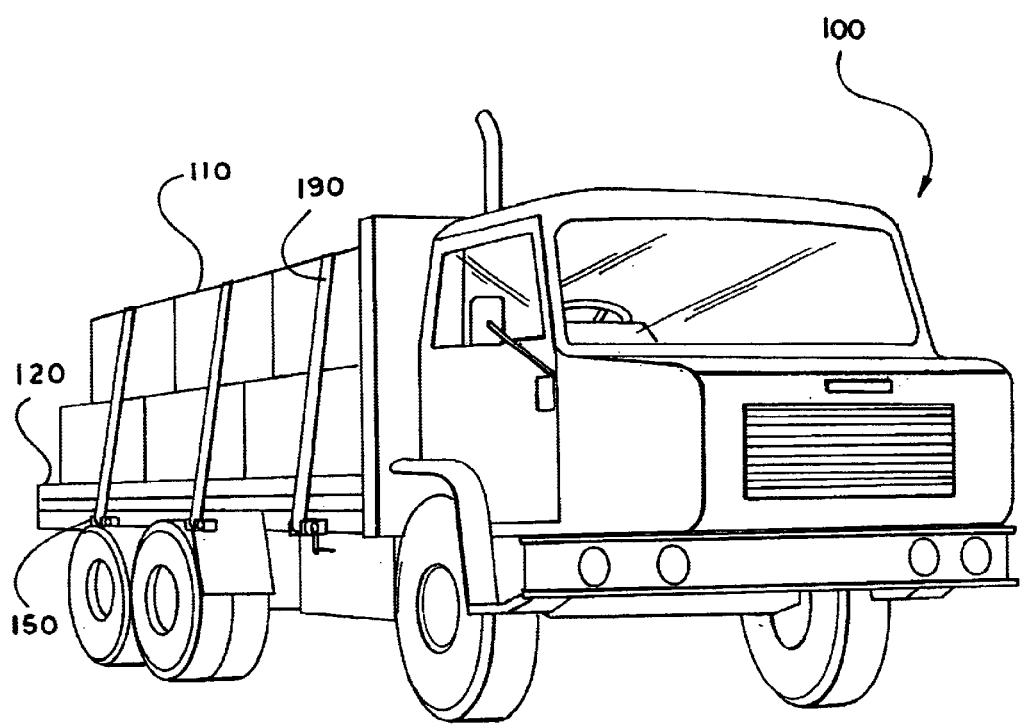
Fig_1

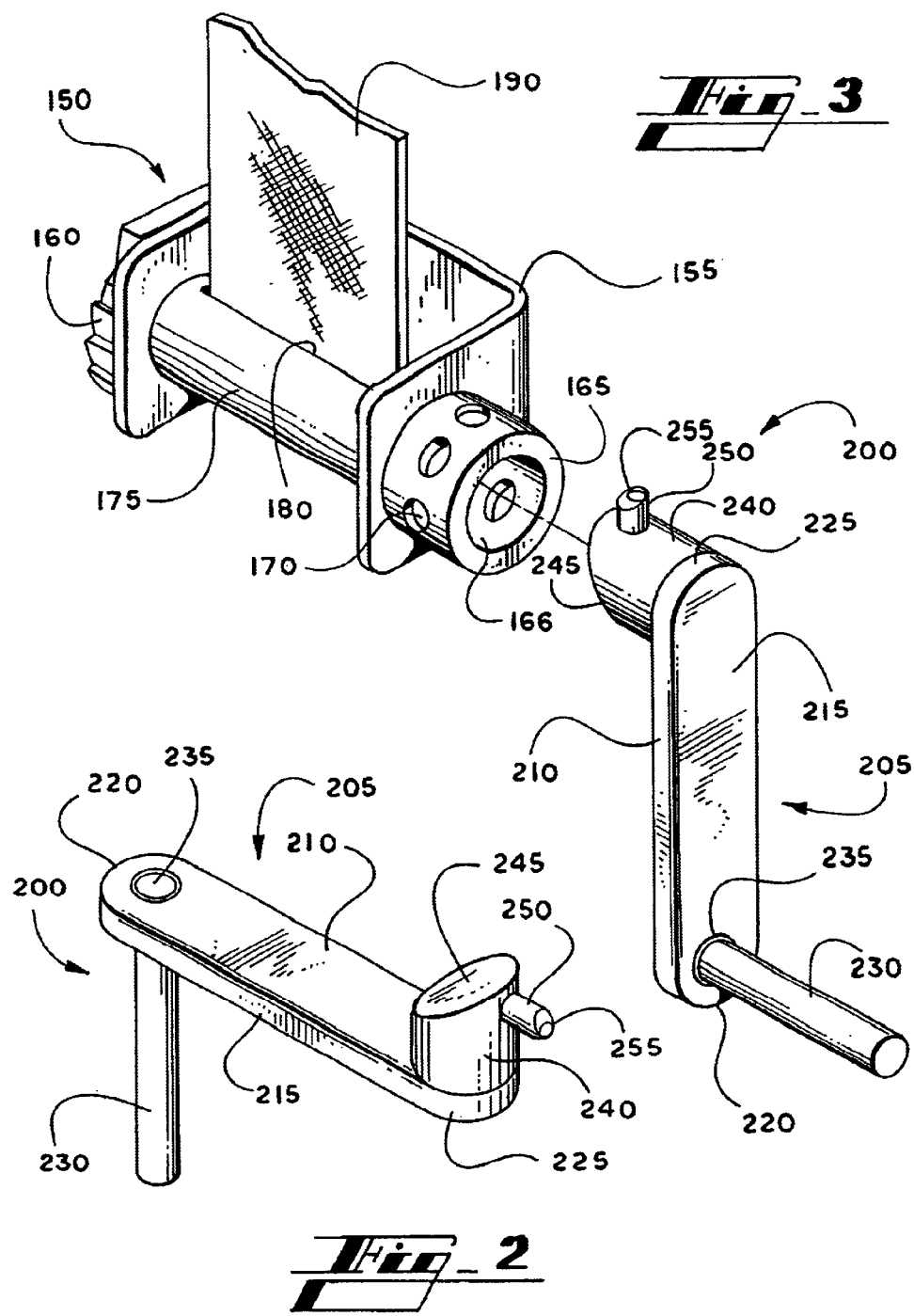

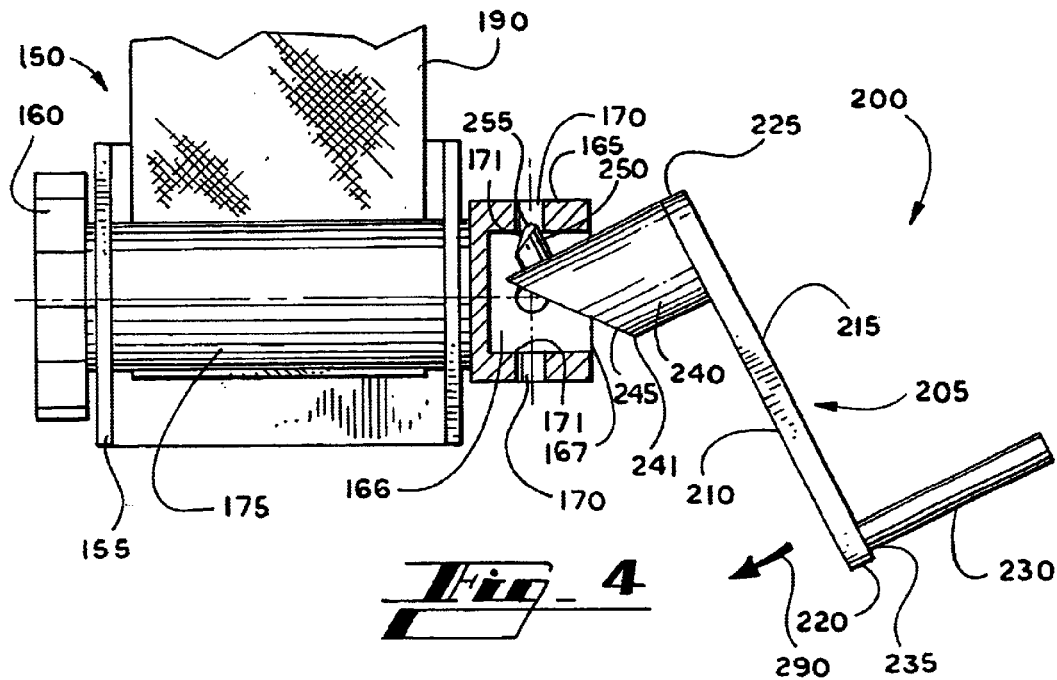
Fig_4
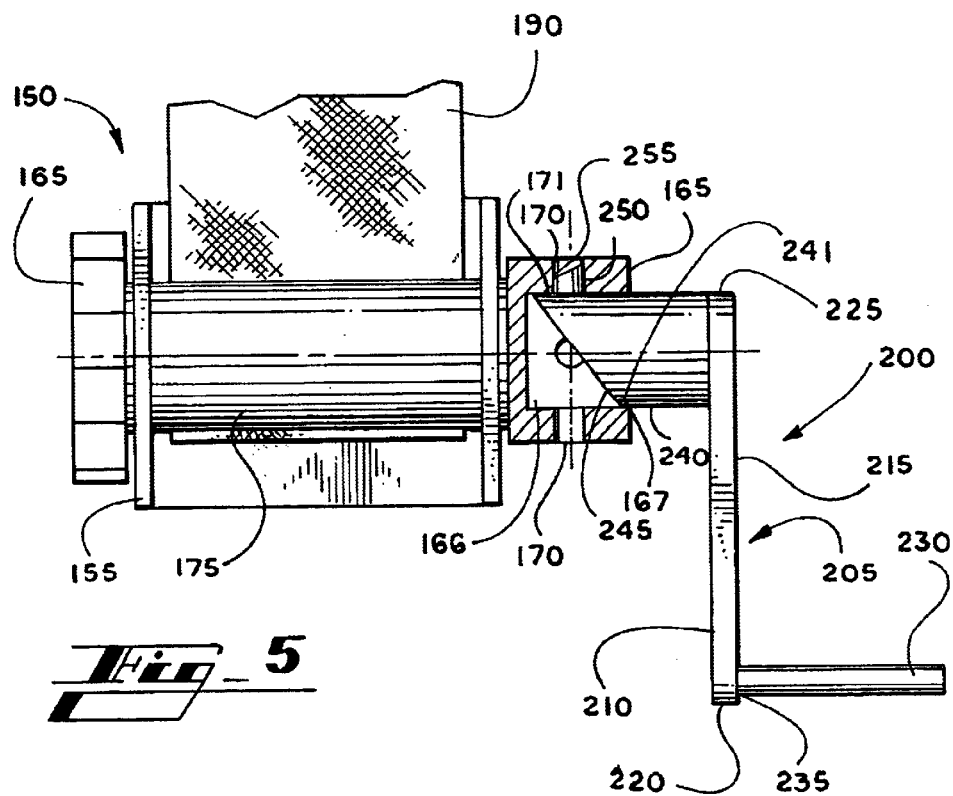
Fig_5

BELT WINCH SPEED HANDLE

BACKGROUND

I. Field of the Invention

The present invention relates generally to the field tie down and belt winches and, more particularly, to a belt winch speed handle apparatus and system.

II. Description of the Related Art

Tie down straps are conventionally used for securing cargo onto flat beds of trucks and the like. One end of the strap is typically connected to one side of the truck and the other end of the strap is connected to a belt winch on the other side of the truck. The strap is placed over the load and the winch is tightened to secure the load on the truck. Each belt winch typically includes a ratchet mechanism and a winding drum. One end of the strap is placed through a slot on the winding drum which is rotated using a winch bar. These winch bars typically fir into an aperture on an annular portion on one end of the winding drum in order to tighten the strap onto the drum by applying a torque on the annular portion and therefore the drum. Once the cargo is secure and moved to the desired location, the strap is removed by releasing the ratchet mechanism. The cargo is removed, leaving the straps unwound from the winch drum. The user must then wind the straps back onto the winch drum either by manually rotating the annular portion or by inserting the winch bar back into the apertures and then rotating the annular portion. This process is typically time consuming and requires considerable effort to prevent the straps, which are typically nylon, from dragging on the pavement; which can fray the straps. Furthermore, in wet and muddy conditions the straps can drag through the water and mud.

SUMMARY

In general, the invention features a belt winch speed handle for speed winding a strap back onto a belt winch having a ratchet mechanism, a winch drum and an annular cylinder. The speed handle generally includes an elongated arm having a grip on the upper surface adjacent the first end and a handle drum on the lower surface adjacent the second end. The handle drum includes a tapered end and is adapted to fit into the annular cylinder of a belt winch. The handler drum includes a protrusion with a tapered end, adapted to fit into an aperture on the annular cylinder. Once placed on the belt winch, the speed handle allows the user to rapidly rewind a strap back onto the winch drum.

In general, in one aspect, the invention features an apparatus, including an elongated arm having a first end, an upper surface, a second end and a lower surface, a grip connected generally perpendicular to the upper surface and adjacent the first end, a handle drum connected generally perpendicular to the lower surface and adjacent the second end and a protrusion connected generally perpendicular to the handle drum in a generally parallel orientation to the elongated central arm.

In one implementation, the grip is rotatably connected to the arm.

In another implementation, the grip is rigidly connected to the arm.

In another implementation, the apparatus further includes a tapered end on the handle drum.

In another implementation, the apparatus further includes a tapered end on the protrusion.

In another implementation, the handle drum is cylindrical.

In another implementation, the protrusion is cylindrical.

In another aspect, the invention features a belt winch system, including a belt winch having a winch drum, a ratchet mechanism connected to one side of the winch drum, an annular cylinder connected to another side of the winch drum, the annular cylinder having a series of apertures in the wall of the annular cylinder and a belt winch speed handle having a handle drum within the hollow interior of the annular cylinder, a protrusion connected generally perpendicular to the handle drum, the protrusion being held within one of the apertures, an arm having one end connected to the handle drum and adjacent the annular cylinder and a grip connected to another end of the arm.

In another aspect, the invention features a belt winch kit, including a belt winch having a winch drum with an elongated slot, a ratchet mechanism connected to one side of the winch drum, an annular cylinder connected to another side of the winch drum, the annular cylinder having a series of apertures in the wall of the annular cylinder a cargo strap adapted to fit within the elongated slot on the winch drum and a belt winch speed handle having a handle drum having a tapered edge and being adapted to rotate fit within the hollow interior of the annular cylinder, a protrusion having a tapered edge and connected generally perpendicular to the handle drum, the protrusion being adapted to fit within one of the apertures, an arm having one end connected to the handle drum and adjacent the annular cylinder and a grip connected to another end of the arm.

In one implementation, the tapered edge of the handle drum is adapted to pass by an inner edged wall of the annular cylinder as the handle is rotated along an arc during placement of the handle into the belt winch.

In another implementation, the tapered edge of the protrusion is adapted to pass by an inner edged wall of one of the apertures as the handle is rotated along an arc during placement of the handle into the belt winch.

In another implementation, the handle is adapted to be rotated as a single unit with the winch drum, the ratchet mechanism and the annular cylinder when the handle drum is placed within the annular cylinder and the protrusion is placed within one of the apertures.

In yet another aspect, the invention features an apparatus for rapidly winding a strap onto a belt winch having a strap drum and an annular cylinder having a series of apertures, the apparatus, including an elongated arm, means for gripping the apparatus connected to one end of the arm, means securing the apparatus within the annular cylinder to secure the apparatus adjacent the belt winch and means for securing the apparatus within the one of the apertures of the belt winch.

One advantage of the invention is that a cargo strap can rapidly be rewound onto a winch drum of a belt winch.

Another advantage is that belts can have reduced wear.

Another advantage is that a belt can be handled with one hand of the user while the user uses the other hand to hold the entire belt.

Another advantage is that the speed handle can be rapidly placed and removed and easily stored.

Other objects, advantages and capabilities of the invention will become apparent from the following description taken in conjunction with the accompanying drawings showing the preferred embodiment of the invention.

BRIEF DESCRIPTION OF THE DRAWINGS

FIG. 1 illustrates a typical cargo truck having a number of belt winches, one having an embodiment of a belt winch speed handle;

FIG. 2 illustrates a perspective view of an embodiment of a speed handle;

FIG. 3 illustrates a perspective view of a belt winch and an embodiment of a speed handle adjacent the belt winch;

FIG. 4 illustrates a front view of a typical belt winch and a side view of an embodiment of a speed handle in a first position; and FIG. 5 illustrates a front view of a typical belt winch and a side view of an embodiment of a speed handle in a second position.

DETAILED DESCRIPTION

Referring to the drawings wherein like reference numerals designate corresponding parts throughout the several figures, reference is made first to FIG. 1 that illustrates a typical cargo truck 100 having a number of belt winches 150, one of the belt winches 150 having an embodiment of a belt winch speed handle 200. Typically, the cargo truck 100 includes a flat bed 120 that can contain a load 110. The belt winches 150 are typically periodically spaced on an underside of the flat bed 120. It is understood that the cargo truck 100 shown is for illustrative purposes and that there are many varieties of trucks that utilize belt winches 150 and that can implement the embodiments of the winch speed handle 200 described herein.

Each belt winch 150 typically includes a belt or strap 190 that is hooked to an opposite side of the flat bed 120 and wrapped onto the belt winch 150 and subsequently tightened to secure the load 110 onto the flat bed.

FIG. 2 illustrates a perspective view of an embodiment of a speed handle 200. The speed handle 200 typically includes an elongated arm 205 having an upper surface 215 and a lower surface 210, a first end 220 and a second end 225. The arm 205 is illustrated as being typically flattened with rounded ends 220, 225. It is understood that the arm 205 can take a variety of forms such as, but not limited to, an elongated cylinder.

A grip 230 is connected generally perpendicular to the upper surface and adjacent the first end 220. The grip 230 can be a simple elongated cylinder as shown. The grip 205 can also be rigidly connected to the arm 205 or it can be pivotally connected at a pivot point 235 so that as the handle 200 is cranked, the grip 230 can remain stationary in the user's hand.

A handle drum 240 is connected generally perpendicular to the lower surface 210 of the arm 205 adjacent the second end 225. The handle drum 240 is shown as a cylindrical body, which can easily fit into the annular cylinder 165 of the belt winch 150 as described further below. It is understood that the handle drum 240 can be a variety of other suitable shapes. The handle drum 240 typically includes a tapered end 245 opposite the end of the handle drum 240 connected to the arm 205. A protrusion 250 is connected generally perpendicular to the outer circumference of the handle drum 240 at the highest point of the tapered end 245 and in a generally parallel orientation to the arm 205. The protrusion 250 can also include a tapered end 255. The protrusion 250 is illustrated as a cylindrical body, which can easily fit into the apertures 170 as described further below. It is understood that the protrusion 250 can be a variety of other suitable shapes.

FIG. 3 illustrates a perspective view of a belt winch 150 and an embodiment of a speed handle 200 adjacent the belt winch 150. The belt winch 150 typically includes a bracket 155, which is typically U-shaped. As mentioned above, the belt winch 150 also includes a ratchet mechanism 160 connected to one end of the bracket 155. A annular cylinder 165 having a series of apertures 170 is connected to the other end of the bracket 155. A winch drum 175 having an elongated slot 180 is held within the bracket 155 and connected to both the ratchet mechanism 160 and to the annular cylinder 165. The strap 190 is shown inserted into the slot 180.

The speed handle 200 includes the elongated arm 205 having an upper surface 215 and a lower surface 210, a first end 220 and a second end 225, the grip 230 connected generally perpendicular to the upper surface and adjacent the first end 220, the handle drum 240 connected generally perpendicular to the lower surface 210 of the arm 205 adjacent the second end 225, and the protrusion 250 is connected generally perpendicular to the outer circumference of the handle drum 240 at the highest point of the tapered end 245 and in a generally parallel orientation to the arm 205.

As illustrated in FIG. 3, the handle drum 240 is adapted to fit into the annular cylinder 165 of the belt winch 150. It is therefore appreciated that a cylindrical shape is chosen for the handle drum 240, providing the best fit into the circular annular cylinder 165. The protrusion 250 is adapted to fit into one of the typically circular apertures 170 of the annular cylinder 165. It is therefore appreciated that a cylindrical shape is chosen for the protrusion 250, providing the best fit into the circular apertures 170. As further appreciated by those skilled in the art, the annular cylinder 165 typically has a hollow interior 166 in order to receive an end of a winch bar as the winch bar is inserted into the annular cylinder 165 to either tighten the strap 190 onto the winch drum 175 or rewind the strap 190 onto the winch drum 175. The embodiment of the speed handle 200 utilizes the hollow interior 166 in order to receive the handle drum 240 and utilizes the apertures 170 to receive the protrusion 250, in order to secure the speed handle 200 to the annular cylinder 165.

FIG. 4 illustrates a front view of a typical belt winch 150 and a side view of an embodiment of a speed handle 200 in a first position. This first position helps to illustrate how the speed handle 200 is inserted into place. In general, the speed handle 200 is inserted into the annular cylinder 165 at an angle so that the protrusion 250 can be properly inserted into one of the apertures 170. In general, the protrusion 250 is placed into one of the apertures 170 at the same time that the handle drum 240 is inserted into the annular cylinder 165. The handle 200 is generally inserted along an arc as indicated by arrow 290. The tapered end 255 of the protrusion 250 generally prevents the protrusion 250 from becoming snagged on the inner wall edges 171 of the aperture 170. The tapered end 255 therefore allows clearance for the protrusion 250. The tapered end 245 of the handle drum 240 generally prevents the handle drum 240 from becoming snagged on the inner wall edges 167 of the annular cylinder 165. The tapered end 245 therefore allows clearance for the handle drum 240. In another embodiment, the lower edge 241 of the tapered end 245 can further be tapered to allow clearance past the inner wall edges 167 of annular cylinder 165 as the handle drum 240 is rotated into the annular cylinder 165 as described immediately below with respect to FIG. 5.

FIG. 5 illustrates a front view of a typical belt winch 150 and a side view of an embodiment of a speed handle 200 in a second position. This second position illustrates the speed handle 200 secured to the belt winch 150. The speed handle 200 can now be rapidly rotated in order to rewind the strap 190 back onto the belt drum 175 with great ease. In a typical implementation, the user holds the strap 190 in one hand while holding the grip 230 and rotating the speed handle 200. Since the protrusion 250 is held within one of the apertures 170 and the handle drum 240 is held within the annular cylinder, the speed handle 200 acts as a single unit with the annular cylinder 165 and therefore the winch drum 175 and ratchet mechanism 165.

In general, the embodiments of the above speed handle have been described for use to rewind a strap back onto its belt winch. In other implementations, embodiments of the speed handle could be used to actually tighten the strap onto the winch drum. However, the handle typically cannot receive enough torque from the user in order to properly tighten the straps. In typical embodiments, the overhang of the flat beds of the trucks do not provide much clearance. Therefore; the arms on the speed handles are typically kept shorter than the clearance so that the handle can be rapidly rotated instead of having to remove and replace the handle on each turn. However, the arm could be made much longer to provide the necessary torque to additionally tighten the straps. However, this additional length generally sacrifices the speed at which the handle can be rotated to rewind the strap with a shorter arm. Furthermore, with the arc that is required to place and remove the handle to and from the belt winch, it can be clumsy to provide a longer arm for purposes of tightening the strap, although it is possible.

It is further appreciated that the embodiments of the speed handle described herein can be rapidly placed and removed and easily stored in various locations on the person or on the truck.

Therefore, the foregoing is considered as illustrative only of the principles of the invention. Further, various modifications may be made of the invention without departing from the scope thereof and it is desired, therefore, that only such limitations shall be placed thereon as are imposed by the prior art and which are set forth in the appended claims.

What is claimed is:

1. A belt winch kit, comprising:
   a belt winch having a winch drum with an elongated slot, a ratchet mechanism connected to one side of the winch drum, an annular cylinder connected to another side of the winch drum, the annular cylinder having a series of apertures in the wall of the annular cylinder;
   a cargo strap adapted to fit within the elongated slot of the winch drum; and
   a belt winch speed handle having a handle drum having a tapered edge and being adapted to rotatably fit within the hollow interior of the annular cylinder and pass by an inner edged wall of the annular cylinder as the handle is rotated along an arc during placement of the handle into the belt winch, a protrusion having a tapered edge and connected generally perpendicular to the handle drum, the protrusion being adapted to fit within one of the apertures, an arm having one end connected to the handle drum and adjacent the annular cylinder and a grip connected to another end of the arm.

2. The kit as claimed in claim 1 wherein the grip is rotatably connected to the arm.

3. The kit as claimed in claim 1 wherein the grip is rigidly connected to the arm.

4. The kit as claimed in claim 1 wherein the handle drum is cylindrical.

5. The kit as claimed in claim 1 wherein the protrusion is cylindrical.

6. The kit as claimed in claim 1 wherein the handle is adapted to be rotated as a single unit with the winch drum, the ratchet mechanism and the annular cylinder when the handle drum is placed within the annular cylinder and the protrusion is placed within one of the apertures.

7. A belt winch kit, comprising:
   a belt winch having a winch drum with an elongated slot, a ratchet mechanism connected to one side of the winch drum, an annular cylinder connected to another side of the winch drum, the annular cylinder having a series of apertures in the wall of the annular cylinder;
   a cargo strap adapted to fit within the elongated slot of the winch drum; and
   a belt winch speed handle having a handle drum having a tapered edge and being adapted to rotatably fit within the hollow interior of the annular cylinder, a protrusion having a tapered edge and connected generally perpendicular to the handle drum, the protrusion being adapted to fit within one of the apertures and pass by an inner edged wall of one of the apertures as the handle is rotated along an arc during placement of the handle into the belt winch, an arm having one end connected to the handle drum and adjacent the annular cylinder and a grip connected to another end of the arm.

8. The kit as claimed in claim 7 wherein the grip is rotatably connected to the arm.

9. The kit as claimed in claim 7 wherein the grip is rigidly connected to the arm.

10. The kit as claimed in claim 7 wherein the handle drum is cylindrical.

11. The kit as claimed in claim 7 wherein the protrusion is cylindrical.

12. The kit as claimed in claim 7 wherein the handle is adapted to be rotated as a single unit with the winch drum, the ratchet mechanism and the annular cylinder when the handle drum is placed within the annular cylinder and the protrusion is placed within one of the apertures.

* * * * *